United States Patent
Theilmann

(10) Patent No.: US 7,792,848 B2
(45) Date of Patent: Sep. 7, 2010

(54) METHOD FOR PERFORMING A MODULARIZATION OF A HYPERTEXT

(75) Inventor: Wolfgang Theilmann, Karlsruhe (DE)

(73) Assignee: SAP AG, Walldorf (DE)

( * ) Notice: Subject to any disclaimer, the term of this patent is extended or adjusted under 35 U.S.C. 154(b) by 293 days.

(21) Appl. No.: 11/332,803

(22) Filed: Jan. 12, 2006

(65) Prior Publication Data

US 2006/0156223 A1    Jul. 13, 2006

(30) Foreign Application Priority Data

Jan. 12, 2005    (EP)    ................... 05000481

(51) Int. Cl.
*G06F 7/00*    (2006.01)
*G06F 17/30*    (2006.01)

(52) U.S. Cl. .................. 707/756; 707/913; 707/942

(58) Field of Classification Search ................ 434/118; 707/10, 201, 203; 715/208, 205
See application file for complete search history.

(56) References Cited

U.S. PATENT DOCUMENTS

| | | | | |
|---|---|---|---|---|
| 6,078,914 | A * | 6/2000 | Redfern ..................... | 707/3 |
| 6,934,723 | B2 * | 8/2005 | Breiter et al. ............... | 707/204 |
| 2001/0034740 | A1 * | 10/2001 | Kerne ....................... | 707/500.1 |
| 2003/0036040 | A1 * | 2/2003 | Kurzweil et al. ............ | 434/169 |
| 2003/0120685 | A1 * | 6/2003 | Duncombe et al. .......... | 707/200 |
| 2003/0163784 | A1 * | 8/2003 | Daniel et al. ................ | 715/514 |
| 2004/0126750 | A1 * | 7/2004 | Theilmann et al. .......... | 434/362 |
| 2006/0155776 | A1 * | 7/2006 | Aust .......................... | 707/201 |

FOREIGN PATENT DOCUMENTS

| | | |
|---|---|---|
| EP | 1069546 A2 | 1/2001 |
| JP | 2003248730 | 5/2003 |

OTHER PUBLICATIONS

"IEEE 100: The Authoritative Dictionary of IEEE Standards Terms", Seventh Edition, NY, IEEE Press, 2000, pp. 527, "hypertext".*
"European Search Report for Application No. EP 05 00 0481", (Jul. 22, 2005),2 pgs.
"Marcromedia—Dreamweaver", http://www.macromedia.com/software/dreamweaver/,(observed Jan. 10, 2006),4 pgs.
"SCORM 2004 2nd Edition—Overview", *SCORM (r) Sharable Content Object Reference Model*, (Jul. 22, 2004),57 pgs.

(Continued)

*Primary Examiner*—James Trujillo
*Assistant Examiner*—Marc Somers
(74) *Attorney, Agent, or Firm*—Schwegman, Lundberg & Woessner, P.A.

(57) ABSTRACT

A method for performing a modularization of an arbitrary structured hypertext with a physical structure and an organizational structure description is disclosed. The hypertext is decomposed into a set of separate modules with specific definable boundaries based on both, the physical structure and the organizational structure description, each module of the set of modules is computed methodically and gradually with respect to coaction with the other modules until forming a completed functional unit reusable and invocable separately. Furthermore, a corresponding hypertext, a module, a computer system, a computer program product and a computer program are disclosed.

27 Claims, 4 Drawing Sheets

OTHER PUBLICATIONS

"SCORM Content Aggregation Model Version 1.3.1", *SCORM (r) Sharable Content Object Reference Model*, (Jul. 22, 2004),281 pgs.

"SCORM Run-Time Environment Version 1.3.1", *SCORM (r) Sharable Content Object Reference Model*, (Jul. 22, 2004),209 pgs.

"SCORM Sequencing and Navigation Version 1.3.1", *SCROM (r) Sharable Content Object Reference Manual*, (Jul. 22, 2004),243 pgs.

"Sharable Content Object Reference Model—Addendum Version 1.2", (Apr. 15, 2005),116 pgs.

Bohl, Oliver, et al., "The Sharable Content Object Reference Model (SCORM)-A Critical Review", *Proceedings of the International Conference on Computers in Education (ICCE '02)*, (2002),950-951.

Cathcart, T. P., "Modularization of Engineering Courses Using HTML Content", *Proceedings of the 33rd Annual Frontiers in Education Conference*, vol. 3 of 3, (2003),p. S2F-S.

Kellar, Melanie, et al., "An Information Architecture to Support Dynamic Composition of Interactive Lessons and Reuse of Learning Objects", *Proceedings of the 37th Hawaii International Conference on Systems Sciences* —2004, (2004),1-10.

Parnas, D. L., "On the Criteria to Be Used in Decomposing Systems into Modules", *Communications of the ACM*, 15(12), (1972),1053-1058.

Yang, Jin-Tan D., et al., "An Implementation of SCORM-Complaint Learning Content Management System—Content Repository Management System", *Proceedings of the 3rd IEEE International Conference on Advanced Learning Technologies (ICALT'03)*, (2003), 1 pg.

* cited by examiner

```
decompose (course).

decompose (node):
  compute sub-nodes; // wrt. organizational or physical structure
  // primary boundary computation
  for each subnode:
    compute most specific module boundary (file/folder)
  // check for overlap in subnode set:  subnodes may overlap among
  //        each other or with their ancestor module
  for each set of overlapping subnodes // note that set size may be 1
    for each subnode within set
      create preliminary module;
    for each file commonly used in several subnodes
      resolve conflict by (a) replication
                         (b) movement to a new preliminary module
                         (c) movement to an existing module or
                         (d) putting all subnodes within one module
    for each preliminary module
      make final module decision by
                         (a) creating final module
                         (b) keeping subnode/files within ancestor module
                         (c) merging subnode/files with other module
    distribute/move files to modules;
    adapt hyperlinks from/to moved files;
  // recursion
  for each subnode
    decompose (subnode);
```

*FIG. 1*

METHOD FOR PERFORMING A MODULARIZATION OF A HYPERTEXT

CLAIM OF PRIORITY

The present patent application claims the priority benefit of the filing date of European Application (EPO) No. 05000481.1 filed Jan. 12, 2005, the entire content of which is incorporated herein by reference.

TECHNICAL FIELD

The present disclosure relates generally to the field of electronic data processing, and more particularly to a method for performing a modularization of an arbitrary structured hypertext.

DESCRIPTION OF THE RELATED ART

Generally, a so-called hypertext is any text that contains links to other documents, as for example words or phrases in the document that can be chosen by a reader and which cause another document to be retrieved and displayed. A link does not just have to be text; however, pictures and icons can also be "clickable". A hyperlink is a way of presenting information in which text, sounds, images, and actions are linked together in a way that allows a user to move between them in whatever order he chooses. Hyperlinks are found in nearly all web pages, allowing users to click their way from page to page. Text hyperlinks are often blue and underlined, but don't have to be. A hypertext usually refers to any text available on the so-called World Wide Web that contains links to other documents. In concept, this is similar to including foot notes in a printed document. However, in hypertext documents a user can switch to the connected item by clicking on a hotspot, usually indicated by a different color from the surrounding text. A hypertext is a machine-readable text that is not sequential but organized so that related items of information are connected.

Although hyperlinks, often referred to as just "links", are common in web pages, they can also be found in other hypertext documents. These include certain encyclopedias, glossaries, dictionaries, and other references that use hyperlinks. The links serve for relating documents or document pieces and allow for a specific presentation and navigation through the resulting structure.

E-learning is a form of education via the internet, a network, or a stand-alone computer. It is a network-enabled transfer of skill and knowledge. E-learning refers to using electronic applications and processes to learn. E-learning applications and processes include web-based learning, computer-based learning, virtual classrooms, and digital collaboration. The delivery of content via electronic media, including the internet, intranet, extranet, satellite, broadcast, video, interactive TV and CD-ROM can be realized by a huge hypertext. Technically, e-learning content constitutes generally a huge hypertext. Though the organizational structure of e-learning content may be well described, a reuse of e-learning content is often restricted by an odd physical structure of the content. Files often contain hyperlinks to other files without any proper and transparent organization. This often forces users who want to reuse specific parts of an e-learning course to import a complete new course or to spend a tremendous effort in extracting specific files they really need.

A process of modularization as an a-posterior process is not considered by current e-learning authoring systems. Instead, the known systems assume that a proper physical structure that allows for modularized and reusable elements is created right from the beginning of the content creation process. The term "modularized" indicates a structuring of modules.

Some authoring systems for Web-sites, as for example DREAMWEAVER have support for physically restructuring a site by moving files and adapting hyperlinks accordingly. However, they have no concept of modules and do not consider any organizational structure information. Therefore, it would be desirable to specify a mechanism such that a hypertext link for example an e-learning course can be easily reused.

BRIEF DESCRIPTION OF THE DRAWINGS

In the drawings,

FIG. 1 is a schematic flowchart of a possible embodiment of the method;

DETAILED DESCRIPTION

Figure 2:
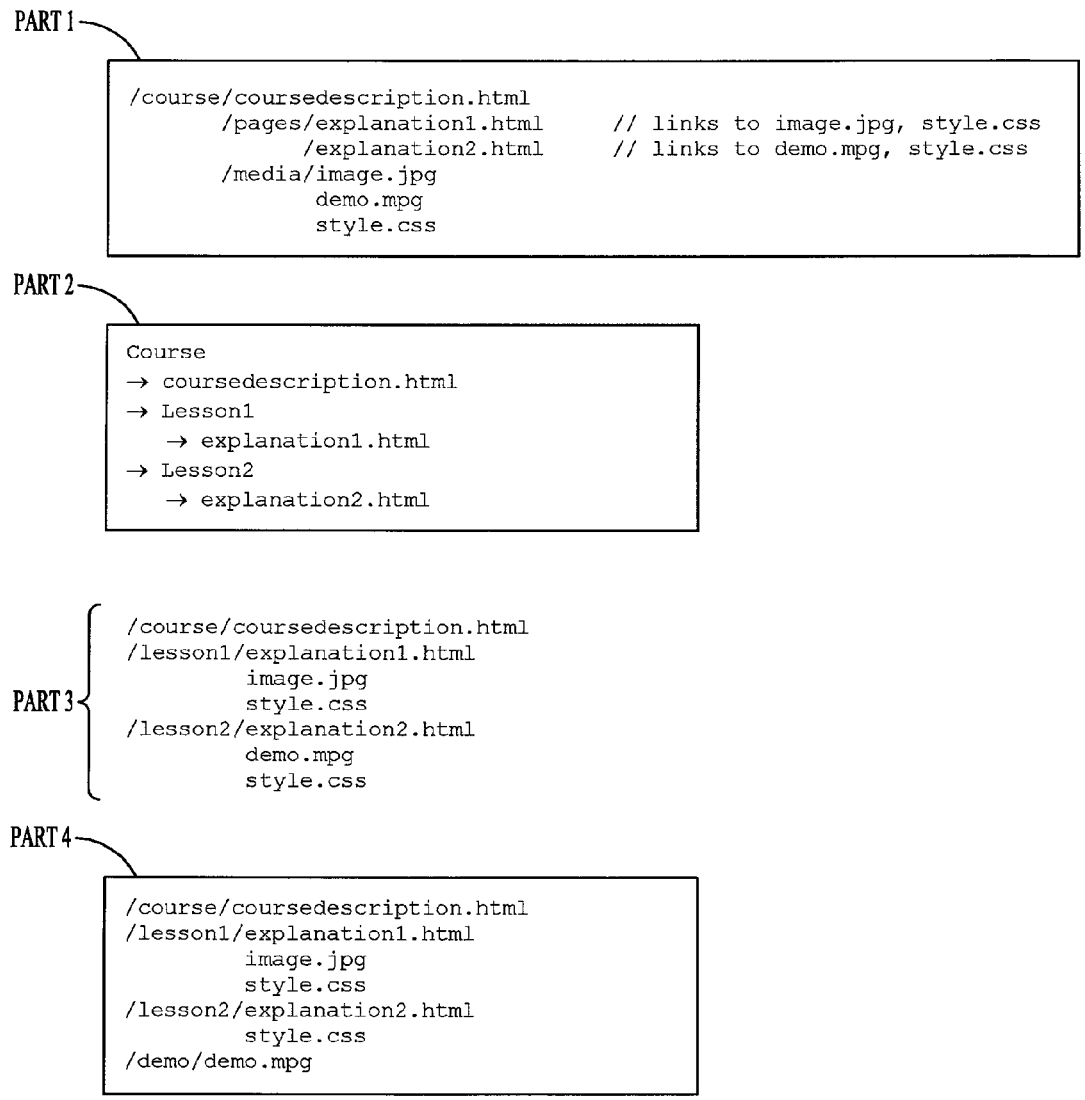
FIG. 2 shows schematically a possible course of operations of a further embodiment.

According to an example embodiment, a method for performing a modularization of an arbitrary structured hypertext with a physical structure and an organizational structure description is provided, wherein the hypertext running on a computer system is decomposed into a set of separate modules with specific definable boundaries based on both, the physical structure and the organizational structure description, each module of the set of modules is computed methodically and gradually with respect to coaction with the other modules of the set of modules until forming a completed functional unit reusable and invocable separately and irrespective of the hypertext.

The method of modularization aims at decomposing a hypertext into well-shaped modules that have a clear structure and can be easily reused. The example method allows for a decomposition of a hypertext by taking into account both, information about the organizational and the physical structure.

The example method can be regarded as an algorithm which combines features of a so-called "Greedy Algorithm" with features of a so-called "Divide-and-Conquer Algorithm". The Greedy Algorithm is an algorithm which always takes the best immediate or local solution while finding an answer. The "Divide-and-Conquer Algorithm" is an algorithmic technique to address a problem of an instance by dividing that instance into two or more instances. Each of these smaller instances is recursively solved, and the solutions are combined to produce a solution for the original instance. The hierarchical approach uses rudimentarily both algorithmic techniques, the division of an overall hypertext into smaller entities, namely modules, and a local solution with regard to most specific module boundaries while decomposing the hypertext and computing appropriate modules.

In an example embodiment, the arbitrary structured hypertext can be chosen as an e-learning course. The organizational structure of the e-learning content is formally described. Such description can be made for example by a structure of chapters, sections and paragraphs. Each item within a structure references a primary file that actually represents the content that can be accessed by this item. In addition items may contain references to subordinate items. The organizational structure must constitute an acyclic directed connected graph, e.g. structure items may reference sub-items without having any cycle. A well known structure form that complies with these assumptions is for example SCORM.

Furthermore, each module may be physically represented either by a single file or by a complete folder, including all its files and subfolders. In addition, modules may contain references to subordinate modules. Overall, the module structure constitutes an acyclic directed connected graph, e.g. modules may reference sub-modules without having any cycle.

A file may be understood as a collection of data that builds up a document. That may be foreseen to be read either by people or by machines. Typically, the concept of files is introduced by operating systems, such as LINUX or WINDOWS.

A module is a logical container that groups together a set of files. In addition, modules may also contain some meta description (meta data). Modules typically have application dependant characteristics such as self-containment or completeness. For example, an e-learning module may consist of a set of files that together explain a certain topic in a complete, self-contained and coherent manner. Modules can build up hierarchies, e.g. larger modules can reference smaller sub-modules. Any module A that is directly or indirectly referencing a module B is called an ancestor of B.

An item is a logical element of the organizational content structure. Each item references a primary file that actually represents the content that can be accessed by this item. In addition items may contain references to subordinate items. Any item A that is directly or indirectly referencing an item B is called an ancestor of B.

Within a further embodiment of the claimed method the organizational structure description of the hypertext comprises several items, each item references at least one file called primary file and the method comprises the following further operations: in a first operation nodes are defined or introduced, each can be either an item within the organizational structure or a file. For a given item represented by a node, sub-nodes are defined which are either sub-items or files referenced by the corresponding primary file. For a given file represented by a node, sub-nodes are defined which are files referenced by the given file. The overall hypertext, as for example the e-learning course, can be represented by a node that has one single sub-node which corresponds actually to a root item of the organizational structure.

For clarification, a node is a virtual entity that either represents an item (from an organizational content structure) or a file. Depending on the underlying items and files, nodes can build up a hierarchy. A node representing a given item has the following sub-nodes: one for each sub-item of the given item and one for each content file referenced by the primary item file. A node representing a given file has the following sub-nodes: one for each file referenced by the given file. Any node A that contains directly or indirectly another node B is called an ancestor of B.

In a following operation most specific module boundaries for each sub-node are computed. These can be files or folders. The most specific boundary of a module consisting of a single file is the file itself. The most specific boundary of a module consisting of more than one file is that folder that contains all of the module files but also contains as few files as possible. Afterwards, a check for an overlap between the sub-nodes is performed. Generally, sub-nodes may overlap among each other or with a so-called ancestor module. An ancestor module is a module that was created based on a node that is an ancestor node of the given node. Overlaps may occur for files that belong to more than one sub-node or that belong to a sub-node and also to an ancestor module. Based on the module boundaries and detected overlaps preliminary modules are created. For each file commonly used in several sub-nodes the existing conflict is resolved by replication of said file, a movement of that file to a further preliminary module, a movement of that file to an existing preliminary module or putting said several sub-nodes within one preliminary module. In a following operation the final module decision is made. The corresponding files are moved or distributed accordingly to the modules and appropriate hyperlinks are adapted from/to the moved files.

In another possible embodiment of the method comprises a recursion operation when a decomposition is continued at a further granularity level. That means that the decomposition of a certain node is recursively continued for each of the respective sub-nodes.

The described method contains two kinds of decision operations, namely the operations for resolving conflicts and the recursion operations when the decomposition is continued at the next granularity level. Both kinds of decision operations can be controlled.

According to a possible embodiment, a targeted decomposition level is configured. This can be for example a configuration corresponding to "up to 3 recursion levels" or "for all organizational items".

Furthermore it is possible that specific allowed conflict resolution operations are configured. These can be for example allowed activities as for example "movement to new modules without replication" or allowed node or file formats as "movement only for html files".

Furthermore it is possible that the decisions which have to be made when performing the method can be explicitly made by a specific user.

An example embodiment also relates to a hypertext with an organizational structure description. The hypertext is compartmentalized into a set of separate modules with specific well-defined boundaries based on the organizational structure description, each module of the set of modules forming a completed functional unit reusable and invocable separately.

It is possible that the hypertext is used as an e-learning course.

Furthermore, it is possible that the modules of the set of separate modules can be directly reused for the composition of a further new hypertext.

There is further provided an example module with well-shaped boundaries integrable within an overall hypertext comprising a plurality of modules, the module forming a completed functional unit reusable and invocable separately and irrespective of the hypertext.

A further example embodiment provides a computer system for performing and providing a modularization of an arbitrary structured hypertext with a physical structure and an organizational structure description. The system comprises a storage and editing unit which is configured to store, provide and edit the arbitrary structured hypertext and a defining and decomposing unit which is configured to define nodes and sub-nodes, each comprising at least one file, and to decompose the hypertext into said nodes and sub-nodes. Furthermore, the system comprises a computing unit configured to compute based on said nodes and sub-nodes methodically and gradually modules with specific definable boundaries with respect to coaction with other modules until forming completed functional units which are reusable and invocable separately.

It is possible that the computing unit further comprises a specific determining unit configured to determine most specific boundaries for each node or sub-node, respectively, and a generating unit configured to generate preliminary and final modules. The most specific boundary of a module consisting of a single file is the file itself. The most specific boundary of a module consisting of more than one file is that folder that contains all of the module files but also contains as few files as possible.

According to another example embodiment of the computer system, the system further comprises a detecting unit which is configured to detect an existing overlap among the nodes and sub-nodes and a selecting unit which is configured to select for each file commonly used in several sub-nodes or nodes with respect of a given configuration replication of said file, movement to a further preliminary module, movement to an existing preliminary module or putting said several sub-nodes within one preliminary module. Such a given configuration can correspond for example to the target of allowed conflict resolution activities, e.g. allowed activities, like "movement to new modules without replication" or allowed node/file formats, like "movement only for html files".

It is possible that the computer system further comprises a distributing unit configured to distribute the files to the respective finally computed modules and adapt hyperlinks from/to the distributed files.

A further example embodiment provides a computer system for performing and providing a modularization of an arbitrary structured hypertext with a physical structure and an organizational structure description, the system comprising a storage and editing unit configured to store, provide and edit the arbitrary structured hypertext, a defining and decomposing unit configured to define nodes and sub-nodes, each comprising at least one file, and to decompose the hypertext into said nodes and sub-nodes, a computing unit configured to compute based on said nodes and sub-nodes methodically and gradually modules with specific definable boundaries with respect to coaction with other modules until the computed modules form completed functional units which are reusable and invocable separately and a distributing unit configured to distribute the files to the respective finally computed modules and adapt hyperlinks from/to the distributed files, wherein the computing unit comprises a determining unit configured to determine most specific boundaries for each node or sub-node, a generating unit configured to generate preliminary and final modules, a detecting unit configured to detect an existing overlap among the nodes and sub-nodes and a selecting unit configured to select for each file commonly used in several sub-nodes or nodes with respect of a given action replication of said file, movement to a further preliminary module, movement to an existing preliminary module or putting said several sub-nodes within one preliminary module.

An example embodiment provides a computer program product with a computer-readable medium and a computer program stored on the computer-readable medium with a program code which is suitable for carrying out a method when the computer program is run on a computer.

An example embodiment also refers to a computer program with a program code which is suitable for carrying out a method when the computer program is run on a computer.

A computer-readable medium with a computer program stored thereon is also provided, the computer program comprising a program code which is suitable for carrying out a method when the computer program is run on a computer.

Further features and embodiments will become apparent from the description and the accompanying drawings.

For purposes of clarity, the present discussion refers to an abstract example of a computer system. However, the method and the system may operate with a wide variety of types of network systems including networks and communication systems dramatically different from the specific example illustrated in the following drawings.

It should be understood that while example embodiments is described in terms of a specific system, that the described technology has applications in a variety of communication systems, such as advanced cable-television systems, advanced telephone networks or any other communication system that would benefit from the described systems or methods. It is intended that the system as used in the specification and claims be reached to cover any communication system unless the context requires otherwise.

Example embodiments are schematically illustrated in the drawings and are explained in detail with reference to the drawings. It is understood that the description is in no way limiting on the scope of the present invention and is merely an illustration of example embodiments.

FIG. 1 shows a flowchart representing an example recursive decomposition algorithm by means of a so-called pseudo-code description. In a first operation the overall hypertext is decomposed by computing sub-nodes. The computing of the sub-nodes is based on an organizational or physical structure of the hypertext. When computing sub-nodes a primary boundary computation for each sub-node is performed. Most specific module boundaries as for example files or folders are computed. The most specific boundary of a module consisting of a single file is the file itself. The most specific boundary of a module consisting of more than one file is that folder that contains all of the module files but also contains as few files as possible. After that a check is performed for possible overlaps in a certain sub-node set. Sub-nodes may overlap among each other or with an appropriate ancestor module. For each set of overlapping sub-nodes it has to be noted that a set size may be 1 for each sub-node within the set of sub-nodes. Preliminary modules are created. For each file which is commonly used in several sub-nodes it has to be found a decision how to create separate modules. This conflict is resolved by a replication of said file, a movement of said file to a new preliminary module, a movement to said file to an existing module or by putting all sub-nodes which overlap among each other within one single module. For each preliminary module a final module decision has to be made. This can be made by creating a final module, by keeping sub-node or files within an ancestor module or by merging sub-node or files with other modules. Afterwards the files are distributed or moved to the corresponding created modules and hyperlinks from or to the moved files are adapted accordingly.

When a decomposition should be continued at a next granularity level a recursion operation follows.

The flowchart shown in FIG. 1 and described above contains two kinds of decision operations. First there is the operation for resolving conflicts and then there is the optional recursion operation. Both kinds of decision operations can be controlled in different possible ways. It is possible to provide a configuration of a targeted decomposition level, as for example by a configuration called "up to level 3" or "for all organizational items". It is also possible to provide a configuration of allowed conflict resolution activities, as for example by allowed activities or by allowed node/file formats. An allowed activity can be for example "movement to new modules without replication". An allowed node or file format can be for example "movement only for html files". It is also possible that the decision operations are performed explicitly by a specific user.

FIG. 2 shows an example of an e-learning course and a potential decomposition method based on this e-learning course. The e-learning course consists of a general description page, called "coursedescription.html", followed by two lessons. Each lesson consists of one single html explanation page, namely "explanation1.html" and "explanation2.html", respectively. Both explanation pages contain hyperlinks to a special media file, namely "image.jpg" and "demo.mpg", respectively, and to a common stylesheet "style.css". The initial content structure, shown in part 1 of FIG. 2 corresponds to a technical or physical course structure. The various files of the course are arranged in a file system hierarchy.

Part 2 of FIG. 2 shows the organizational structure of the e-learning course. The organizational structure describes how the course is to be presented to a learner; it thus describes the course elements up to single pages that will be presented. Part 2 of FIG. 2 shows the structure by showing the item hierarchy as well as the links to the respective primary content file. The item "Course" is an ancestor item of the items "Lesson1" and "Lesson2". Item "Course" references to a primary file "coursedescription.html" that actually represents the content that can be accessed by the item "Course". Item "Lesson1" that is directly referenced by item "Course" references a primary file "explanation1.html" while item "Lesson2" that is also directly referenced by item "Course" references as primary file "explanation2.html".

When executing a method, four modules are finally computed as shown in part 3 of FIG. 2. One for the overall e-learning course, one for each lesson and one for the demo movie. Part 3 of FIG. 2 shows the associated content structure.

The execution of the decomposition algorithm that allows transforming the initial content structure of part 1 of FIG. 2 to the final one by exploiting also the given organizational structure as shown in part 2 of FIG. 2 can be described by the following operations:
1. The method starts by decomposing a so-called course node as the root node of the overall e-learning course.
2. It detects three sub-nodes, namely the two lesson nodes and the file "coursedescription.html."
3. It computes module boundaries as "course/" for the two lessons and as the file itself for the html file.
4. Next, an overlap between the two lesson sub-nodes and the course description is detected. Preliminary modules, as for example "course", "lesson 1", "lesson 2" are created.

It is detected that the file "style.css" is used by two sub-nodes. This conflict is resolved by replication of said file.

Finally, final modules are created, the files are moved accordingly and hyperlinks are adapted as necessary.

The resulting content structure is shown in part 3 of FIG. 2.

In addition, an optional recursion operation can be foreseen, which continues with sub-node "coursedescription.html." As this node has no further sub-nodes this recursion branch stops.

Next, the sub-node "lesson 1" is decomposed. This node has three sub-nodes. However, it is decided that it is not worth creating distinct modules for any of these sub-nodes, thus these sub-nodes remain with their ancestor sub-node, namely the sub-node "lesson 1".

Finally, the sub-node "lesson 2" is decomposed. It is decided that it is worth while separating "demo.mpg" into a dedicated module for allowing a direct reuse of this video as it is indicated in part 4 of FIG. 2. Thus, this file is removed to a new location namely "/demo/demo.mpg" and hyperlinks are adapted accordingly.

Figure 3:
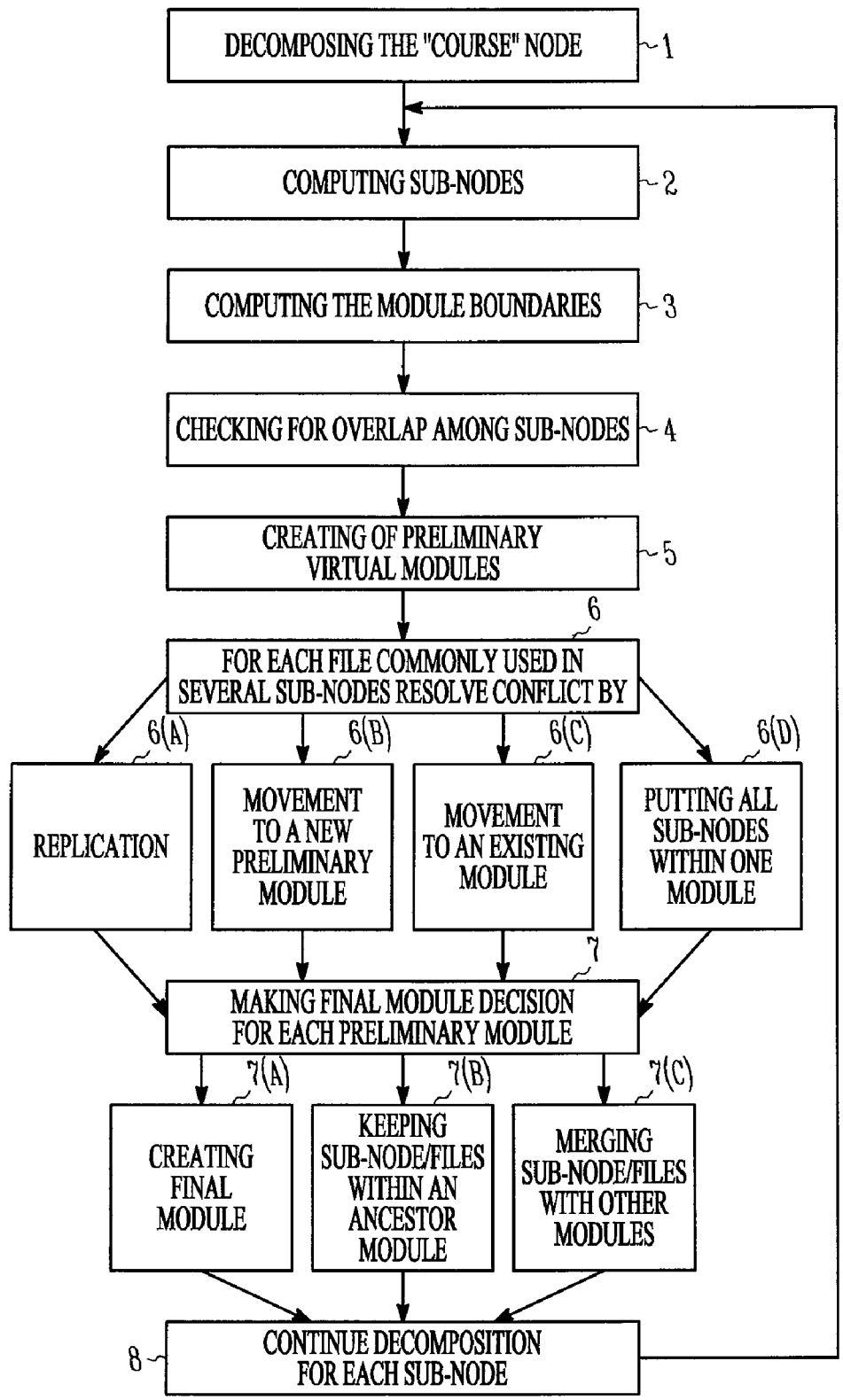
FIG. 3 shows a schematic flowchart of another embodiment of the method.

FIG. 3 shows a flowchart presenting succeeding operations of a possible embodiment of the method. The following description refers to an e-learning course with an organizational and a physical structure. It is assumed that the overall e-learning course is represented by a node that has one single sub-node which is actually the root item of the organizational structure. This root node is called "Course". In operation 1 it is started by decomposing the "Course" node. In operation 2 sub-nodes of the "Course" node are computed. This is done with respect to the organizational and/or the physical structure of the overall e-learning course. In operation 3 most specific module boundaries are computed for each sub-node. These can be files or folders. The most specific boundary of a module consisting of more than one file is that folder that contains all of the module files but also contains as few files as possible. In operation 4 the set of sub-nodes is checked with respect to existing overlaps. Sub-nodes may overlap among each other or with an appropriate ancestor module. In operation 5 preliminary virtual modules are created for each sub-node. For each file which is commonly used in several sub-nodes that conflict is resolved in operation 6 by replication (6(*a*)), by a movement of the file to a new preliminary module (6(*b*)), by a movement of the file to an existing module (6(*c*)) or by putting all sub-nodes within one module (6(*d*)). Finally, in operation 7, the final module decision is made for each preliminary module by creating a finale module(7(*a*)), by keeping sub-node/files within the appropriate ancestor module (7(*b*)) or by merging sub-node/files with other modules (7(*c*)). The files are then distributed to the respective modules and hyperlinks are adapted from/to the moved files. In operation 8 the decomposition is optionally continued for each sub-node and the same procedure restarts with operation 2 as it is indicated by a respective arrow.

Figure 4:
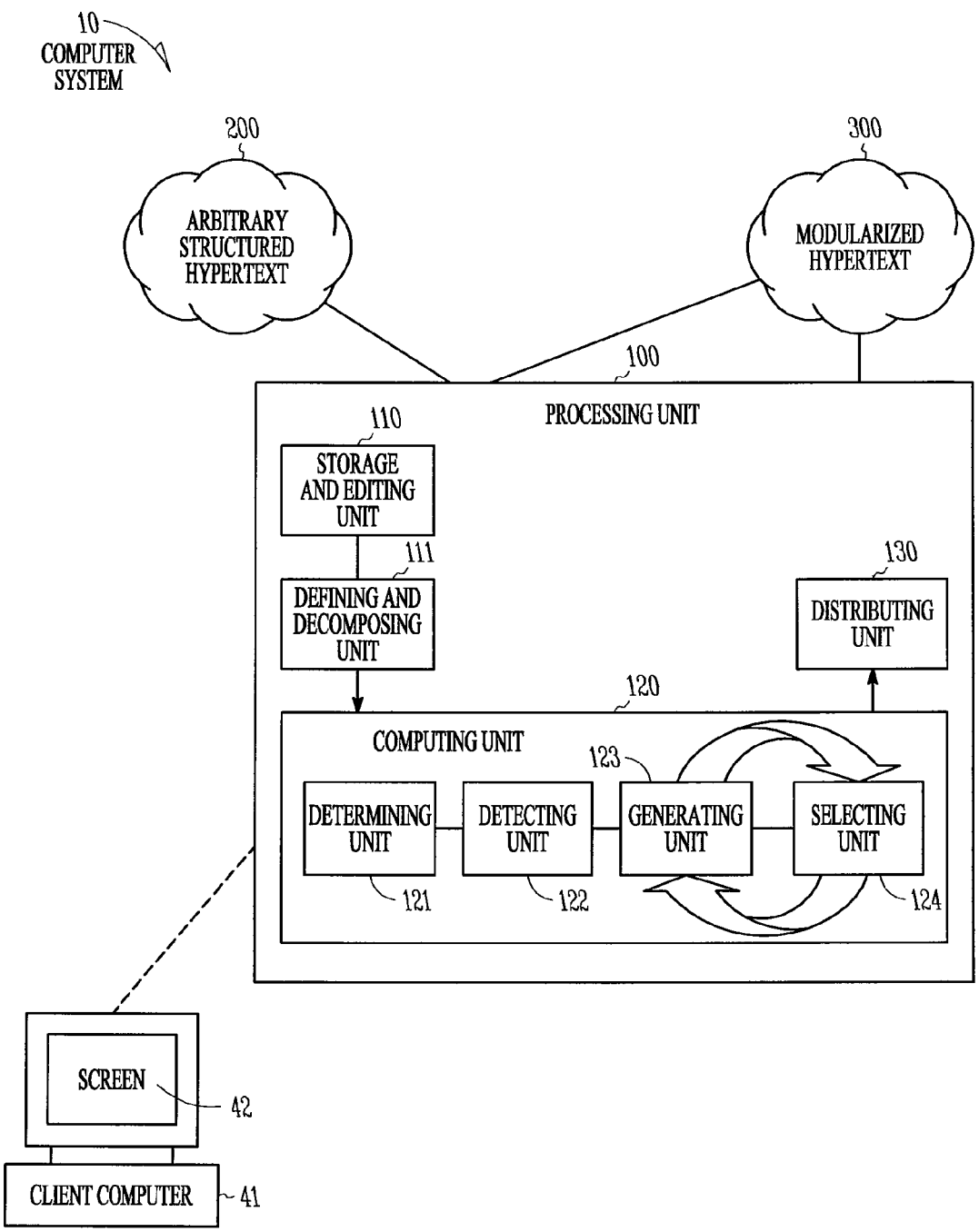
FIG. 4 shows a schematic view of an embodiment of the computer system.

FIG. 4 shows a schematic view of a computer system 10 which is appropriate to perform and provide a modularization of an arbitrary structured hypertext 200 with a physical structure and an organizational structure description. The computer system 10 comprises an overall processing unit 100. The processing unit 100 comprises multiple function units which can all be implemented as components which can communicate via appropriate interfaces. It is possible that there are both wired and wireless connections between them. The processing unit 100 comprises a storage and editing unit 110 which is able to read, store and edit the arbitrary structured hypertext 200 which has to be modularized. This unit 110 can still be divided into two sub-units. One of those sub-units would be configured to store the hypertext with its physical structure, the other one of the sub-units would be configured to edit and provide the organizational structure description of the hypertext. The storage and editing unit 110 is coupled with a defining and decomposing unit 111. The defining and decomposing unit 111 is configured to define nodes and sub-nodes, each comprising at least one file, and to decompose the hypertext 200 memorized by the storage and editing unit 110 into said nodes and sub-nodes. The decomposing unit 111 is connected with a computing unit 120. The resulting decomposition of the hypertext 200 is transferred from the decomposing unit 111 to the computing unit 120 via an appropriate interface as indicated by an arrow. The computing unit 120 is appropriate to compute based on said nodes and sub-nodes methodically and gradually modules with specific definable boundaries with respect to coaction with other modules until those modules form completed functional units which are reusable and invocable separately. The computing unit 120 comprises a determining unit 121 which is configured to determine most specific boundaries for each node or sub-node, respectively. These can be files or folders. The most specific boundary of a module consisting of a single file is the file itself. The most specific boundary of a module consisting of more than one file is that folder that contains all of the module files but also contains as few files as possible. The determining unit 121 communicates with a detecting unit 122 which is configured to detect existing overlaps among the nodes or sub-nodes, respectively. On the basis of the computed boundaries and the possibly detected overlaps a generating unit 123 which is connected with the detecting unit 122 and the determining unit 121 can generate preliminary (virtual) modules. The generating unit 123 can generate preliminary and final modules with the respective boundaries. The generating unit 123 is connected with a selecting unit 124. The selecting unit 124 reexamines the preliminary modules with respect of files which are commonly used in several modules. The selecting unit 124 is able to select for each file commonly used in several sub-nodes or nodes with respect of a given action replication of said file, movement to a further preliminary module, movement to an existing preliminary module or putting said several sub-nodes within one preliminary module. According to that decision which is communicated to the generating unit 123, the generating unit 123 modifies the preliminary modules appropriately and creates final modules. A distributing unit 130 which is directly coupled with the computing unit 120 finally distributes the files to the respective finally computed modules and adapts hyperlinks from/to the distributed files so that a modularized hypertext 300 results. This hypertext 300 can be suitably visualized or displayed on a screen 42 of a client computer 41. With help of the client computer 41 configuration targets can be introduced in the computing procedure when modularizing the hypertext 200. A user can access the processing unit 100 using the client computer 41, e.g. via a direct connection or a network connection. Optionally the modularized hypertext 300 can still be further decomposed. The hypertext 300 would then be handled by the described units of the processing unit 100 as described for the hypertext 200.

What is claimed is:

1. A computer-readable storage medium with instructions stored thereon that, when executed by a computer, cause the computer to perform a method, comprising:
   identifying a plurality of hypertext files and non-hypertext files associated with a node, each non-hypertext file being used by one or more of the hypertext files;
   and decomposing the node into a set of final modules, wherein the decomposing further includes:
      computing a plurality of sub-nodes of the node based on the hypertext files, wherein the computing includes defining a module boundary for a respective sub-node, wherein the defining includes associating the sub-node with one or more of the non-hypertext files used for a hypertext file on which the sub-node is based;
      detecting, for a respective non-hypertext file, that an overlapping use of a same non-hypertext file exists among two or more of the sub-nodes in the computer;
      creating, for the respective non-hypertext file for which the overlapping use of the same non-hypertext file is detected, a set of preliminary modules based on the detected overlapping use of the same non-hypertext file among the two or more of the sub-nodes in the computer;
      resolving the overlapping use of the same non-hypertext file using the preliminary modules;
      and refining the preliminary modules into the final modules as a function of an outcome of the resolving of the overlapping use.

2. The computer-readable storage medium of claim 1, wherein the overlapping use of the same non-hypertext file occurs when an identical name of the same non-hypertext file exists in two or more of the sub-nodes at the same time.

3. The computer-readable storage medium of claim 1, wherein a preliminary module is created for each of the sub-nodes that include an identical name of the same non-hypertext file.

4. A computer-implemented method for modularizing a node, the method comprising:
   introducing the node to a processing computer, wherein the introducing includes storing the node to a storage unit communicatively coupled to the processing computer;
   identifying, in the processing computer, a plurality of hypertext files and non-hypertext files associated with the node;
   decomposing, in the processing computer, the node into a set of final modules, wherein the decomposing includes:
      computing a plurality of sub-nodes of the node based on the hypertext files, wherein the computing includes defining a module boundary for a respective sub-node, wherein the defining includes associating the sub-node with one or more of the non-hypertext files used for a hypertext file on which the sub-node is based;
      detecting, for a respective non-hypertext file, that an overlapping use of a same non-hypertext file exists among two or more of the sub-nodes in the computer;
      creating, for the respective non-hypertext file for which the overlapping use of the same non-hypertext file is detected, a set of preliminary modules based on the detected overlapping use of the same non-hypertext file among the two or more of the sub-nodes in the computer;
      resolving the overlapping use of the same non-hypertext file using the preliminary modules;
      and refining the preliminary modules into the final modules as a function of an outcome of the resolving of the overlapping use;
   and sending at least one of the final modules to a client computer for display on the client computer.

5. The computer-implemented method of claim 4, wherein identifying a plurality of hypertext files and non-hypertext files associated with the node includes choosing an e-learning course as the node.

6. The computer-implemented method of claim 4, wherein decomposing, in the processing computer, the node into a set of final modules further includes performing recursive decomposition of each module until a targeted decomposition level is reached.

7. The computer-implemented method of claim 4, wherein resolving the overlapping use of the same non-hypertext file using the preliminary modules also includes replicating the non-hypertext file throughout the preliminary modules in the processing computer.

8. The computer-implemented method of claim 4, wherein resolving the overlapping use of the same non-hypertext file using the preliminary modules also includes moving the non-hypertext file to a new preliminary module created in the processing computer.

9. The computer-implemented method of claim 4, wherein resolving the overlapping use of the same non-hypertext file using the preliminary modules also includes moving the non-hypertext file to an existing preliminary module in the processing computer.

10. The computer-implemented method of claim 4, wherein resolving the overlapping use of the same non-hypertext file using the preliminary modules also includes putting all sub-nodes within one preliminary module.

11. The computer-implemented method of claim 4, further comprising adapting appropriate hyperlinks according to the refining of the preliminary modules into final modules.

12. The computer-implemented method of claim 4, further comprising configuring allowed conflict resolution activities according to a file format.

13. The computer-implemented method of claim 4, wherein the client computer is directly coupled to the processing computer.

14. The computer-implemented method of claim of 4, wherein the overlapping use of the same non-hypertext file occurs when an identical name of the same non-hypertext file exists in two or more of the sub-nodes at the same time.

15. The computer-implemented method of claim of 4, wherein a preliminary module is created for each of the sub-nodes that include an identical name of the same non-hypertext file.

16. A device to modularize a node, the device comprising:
an interface to provide connection with a client computer;
memory, operatively coupled with the interface, to store contents of the node; and
a processor, operatively coupled with the memory, to: identify a plurality of hypertext files and non-hypertext files associated with the node and to decompose the node into a set of final modules, wherein the processor is further configured, in the decomposing, to:
compute a plurality of sub-nodes of the node based on the hypertext files, wherein the computing includes defining a module boundary for a respective sub-node, wherein the defining includes associating the sub-node with one or more of the non-hypertext files used for a hypertext file on which the sub-node is based;
detect, for a respective non-hypertext file, that an overlapping use of a same non-hypertext file exists among two or more of the sub-nodes in the computer;
create, for the respective non-hypertext file for which the overlapping use of the same non-hypertext file is detected, a set of preliminary modules based on the detected overlapping use of the same non-hypertext file among the two or more of the sub-nodes in the device;
resolve the overlapping use of the same non-hypertext file using the preliminary modules; and
refine the preliminary modules into the final modules as a function of an outcome of the resolving of the overlapping use.

17. The device of claim 16, wherein the processor, in identifying a plurality of hypertext files and non-hypertext files associated with the node, is configured to choose an e-learning course as the node.

18. The device of claim 16, wherein the processor, in decomposing the node into a set of final modules, is further configured to perform recursive decomposition of each module until a targeted decomposition level is reached.

19. The device of claim 16, wherein the processor, in resolving the overlapping use of the same non-hypertext file using the preliminary modules, is configured to replicate the non-hypertext file throughout the preliminary modules in the device.

20. The device of claim 16, wherein the processor, in resolving the overlapping use of the same non-hypertext file using the preliminary modules, is configured to move the non-hypertext file to a new preliminary module created in the device.

21. The device of claim 16, wherein the processor, in resolving the overlapping use of the same non-hypertext file using the preliminary modules, is configured to move the non-hypertext file to an existing preliminary module in the device.

22. The device of claim 16, wherein the processor, in resolving the overlapping use of the same non-hypertext file using the preliminary modules, is configured to put all sub-nodes within one preliminary module.

23. The device of claim 16, wherein the processor is further configured to adapt appropriate hyperlinks according to the refinement of the preliminary modules into final modules.

24. The device of claim 16, wherein the processor is operable to configure allowed conflict resolution activities according to a file format.

25. The computer-implemented method of claim 4, wherein the client computer is coupled to the processing computer via a network.

26. The device of claim 16, wherein the overlapping use of the same non-hypertext file occurs when an identical name of the same non-hypertext file exists in two or more of the sub-nodes at the same time.

27. The device of claim 16, wherein a preliminary module is created for each of the sub-nodes that include an identical name of the same non-hypertext file.

* * * * *